(12) United States Patent
Herdrich et al.

(10) Patent No.: US 9,870,047 B2
(45) Date of Patent: *Jan. 16, 2018

(54) POWER EFFICIENT PROCESSOR ARCHITECTURE

(71) Applicant: Intel Corporation, Santa Clara, CA (US)

(72) Inventors: Andrew J. Herdrich, Hillsboro, OR (US); Rameshkumar G. Illikkal, Folsom, CA (US); Ravishankar Iyer, Portland, OR (US); Sadagopan Srinivasan, Hillsboro, OR (US); Jaideep Moses, Portland, OR (US); Srihari Makineni, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/192,134

(22) Filed: Jun. 24, 2016

(65) Prior Publication Data
US 2016/0306415 A1    Oct. 20, 2016

Related U.S. Application Data

(63) Continuation of application No. 15/134,770, filed on Apr. 21, 2016, which is a continuation of application
(Continued)

(51) Int. Cl.
*G06F 1/32* (2006.01)
*G06F 12/08* (2016.01)
(Continued)

(52) U.S. Cl.
CPC .......... *G06F 1/3293* (2013.01); *G06F 1/3206* (2013.01); *G06F 1/3287* (2013.01);
(Continued)

(58) Field of Classification Search
None
See application file for complete search history.

(56) References Cited

U.S. PATENT DOCUMENTS 5,257,375 A   10/1993  Clark et al.
6,434,590 B1   8/2002  Blelloch et al.
(Continued)

FOREIGN PATENT DOCUMENTS

CN      1993670       7/2007
CN      101539798 A   9/2009
(Continued)

OTHER PUBLICATIONS

Wang, et al., "Helper Threads via Virtual Multithreading on an Experimental Itanium 2 Processor-based Platform," Oct. 9-13, 2004, pp. 144-155.
(Continued)

*Primary Examiner* — Kim Huynh
*Assistant Examiner* — Joshua Neveln
(74) *Attorney, Agent, or Firm* — Trop, Pruner & Hu, P.C.

(57) ABSTRACT

In one embodiment, the present invention includes a method for receiving an interrupt from an accelerator, sending a resume signal directly to a small core responsive to the interrupt and providing a subset of an execution state of the large core to the first small core, and determining whether the small core can handle a request associated with the interrupt, and performing an operation corresponding to the request in the small core if the determination is in the affirmative, and otherwise providing the large core execution state and the resume signal to the large core. Other embodiments are described and claimed.

12 Claims, 11 Drawing Sheets

Related U.S. Application Data

No. 13/992,361, filed as application No. PCT/US2011/050580 on Sep. 6, 2011, now Pat. No. 9,360,927.

(51) Int. Cl.
| | |
|---|---|
| H04W 88/02 | (2009.01) |
| H04W 52/02 | (2009.01) |
| G06F 9/44 | (2006.01) |
| G06F 13/24 | (2006.01) |
| G06F 9/50 | (2006.01) |
| G06F 12/084 | (2016.01) |

(52) U.S. Cl.
CPC .......... *G06F 9/4418* (2013.01); *G06F 9/5094* (2013.01); *G06F 12/084* (2013.01); *G06F 13/24* (2013.01); *H04W 52/028* (2013.01); *H04W 88/02* (2013.01); *G06F 2212/1028* (2013.01); *G06F 2212/60* (2013.01); *G06F 2212/62* (2013.01); *Y02B 60/121* (2013.01); *Y02B 60/142* (2013.01); *Y02B 60/167* (2013.01); *Y02B 60/50* (2013.01)

(56) References Cited

U.S. PATENT DOCUMENTS

| | | | |
|---|---|---|---|
| 7,376,954 | B2 | 5/2008 | Kissell |
| 7,451,146 | B2 | 11/2008 | Boehm |
| 7,461,275 | B2 | 12/2008 | Belmont et al. |
| 2004/0215987 | A1 | 10/2004 | Farkas et al. |
| 2005/0081203 | A1 | 4/2005 | Aguilar et al. |
| 2006/0075404 | A1 | 4/2006 | Rosu et al. |
| 2006/0150184 | A1 | 7/2006 | Hankins |
| 2006/0200692 | A1 | 9/2006 | Kito et al. |
| 2007/0101174 | A1 | 5/2007 | Tsukimori et al. |
| 2007/0136617 | A1 | 6/2007 | Kanno et al. |
| 2007/0245164 | A1 | 10/2007 | Mitarai |
| 2007/0266264 | A1 | 11/2007 | Lewites et al. |
| 2007/0283128 | A1 | 12/2007 | Hoshaku |
| 2008/0126747 | A1 | 5/2008 | Griffen et al. |
| 2008/0263324 | A1 | 10/2008 | Sutardja et al. |
| 2009/0089470 | A1 | 4/2009 | Ven |
| 2009/0222654 | A1 | 9/2009 | Hum et al. |
| 2009/0248934 | A1 | 10/2009 | Ge et al. |
| 2009/0319712 | A1 | 12/2009 | Pudipeddi et al. |
| 2010/0005474 | A1 | 1/2010 | Sprangle et al. |
| 2010/0030927 | A1 | 2/2010 | Heard |
| 2010/0185886 | A1 | 7/2010 | Mitarai |
| 2011/0055434 | A1 | 3/2011 | Pyers et al. |
| 2011/0087815 | A1 | 4/2011 | Kruglick |
| 2011/0119672 | A1 | 5/2011 | Ramaraju et al. |
| 2011/0138388 | A1 | 6/2011 | Wells et al. |
| 2011/0213934 | A1 | 9/2011 | Greenhalgh et al. |
| 2011/0213935 | A1 | 9/2011 | Greenhalgh et al. |
| 2011/0213947 | A1 | 9/2011 | Mathieson et al. |
| 2011/0271079 | A1 | 11/2011 | Rymarczyk et al. |
| 2011/0307730 | A1 | 12/2011 | Marshall et al. |

FOREIGN PATENT DOCUMENTS

| | | |
|---|---|---|
| EP | 2157507 A1 | 2/2010 |
| JP | H06-348513 | 12/1994 |
| JP | H08-249018 | 9/1996 |
| JP | 2006244382 A | 9/2006 |
| JP | 2007148952 A | 6/2007 |
| JP | 2010113641 A | 5/2010 |
| JP | 2010538371 A | 12/2010 |
| JP | 2011-118871 | 6/2011 |
| KR | 10-2001-0081010 | 8/2001 |
| KR | 1020070116740 | 12/2007 |
| TW | 200915061 A | 4/2009 |
| TW | 200941209 A | 10/2009 |
| WO | 01/20434 | 3/2001 |
| WO | 2006013857 | 2/2006 |
| WO | 2006/074027 | 7/2006 |
| WO | 2006/074027 | 8/2006 |
| WO | 2008152790 | 12/2008 |
| WO | 2009029643 A2 | 3/2009 |
| WO | 2011/026084 A1 | 3/2011 |

OTHER PUBLICATIONS

Takao Moriyama, et al., "A Multiprocessor Resource Management Scheme Which Considers Program Grain Size," IPSJ Research Report, Jul. 18, 1990, vol. 90, N. 60, pp. 103-108.
Dai Honda, et al., "An Efficient Caching Technique Using Speculative Threads on Hyper-Threading Technology," IPSJ Research Report, Jul. 31, 2004, vol. 2004, No. 80, pp. 43-48.
Deborah T. Marr, et al., "Hyper-Threading Technology Architecture and Microarchitecture," Intel Technology Journal Q1, Feb. 14, 2002, vol. 6, Issue 2, pp. 4-15.
P. Agnihotri, et al., The Penn State Computing Condominium Scheduling System, Conference on Nov. 7-13, 1998, pp. 1-30.
S. Goel, et al., "Distributed Scheduler for High Performance Data-Centric Systems," IEEE Tencon 2003, pp. 1-6.
Chang-Qin Huang, et al., "Intelligent Agent-Based Scheduling Mechanism for Grid Service," Aug. 26-29, 2004, pp. 1-6.
Rakesh Kumar, et al., "Single-ISA Heterogeneous Multi-Core Architectures: The Potential for Processor Power Dec. 2003, pp. 1-12. Reduction,".
Daniel Shelepov, et al., "HASS: A Scheduler for Heterogeneous Multicore Systems," 2009, pp. 1-10.
Tong Li, et al., "Operating System Support for Overlapping-ISA Heterogeneous Multi-core Architectures," Date?, pp. 1-12.
Philip M. Wells, et al., "Dynamic Heterogeneity and the Need for Multicore Virtualization," 2007, pp. 1-10.
International Searching Authority, "Notification of Transmittal of the International Search Report and the Written Opinion of the International Searching Authority," dated May 1, 2012, in International application No. PCT/US2011/050580.
U.S. Appl. No. 13/995,994, filed Jun. 20, 2013, entitled, "Providing an Asymmetrical Multicore Processor System Transparently to an Operating System," by Boris Ginzberg.
Japanese Patent Office, Office Action dated May 12, 2015, in Japanese Patent Application No. 2014-528345.
Taiwan Patent Office, Taiwan Office Action dated Sep. 23, 2014, in Taiwan Application No. 101132336. (Translation Redacted).
Japan Patent Office, Notice of Reason for Rejection dated Apr. 5, 2016 in Japanese Patent Application No. 2014-528345.
Korea Intellectual Property Office, Notice of Final Rejection dated Dec. 30, 2015 in Korean Patent Application No. 10-2014-7005804.
Greenhalgh, "Big.LITTLE Processing with ARM Cortex tm-A15 and Cortex-A7; Improving Energy Efficiency in High-Performance Mobile Platforms", Sep. 2011, 8 pages.
China Patent Office, Office Action dated Sep. 28, 2015 in Chinese Patent Application No. 201180073263.X.
Korean Patent Office, Office Action dated Apr. 15, 2015, in Korean Application No. 10-2014-7005804.
Korea Intellectual Property Office, Notice of Preliminary Rejection dated Sep. 12, 2016, in Korean Patent Application No. 10-2016-7012946.
Korea Intellectual Property Office, Notice of Preliminary Rejection dated Sep. 12, 2016, in Korean Patent Application No. 10-2016-7012948.
Great Britain Intellectual Property Office, Examination Report dated Sep. 22, 2016 in Great Britain Patent Application No. GB1402807.0.
State Intellectual Property Office of the People's Republic of China, Decision of Rejection dated Oct. 8, 2016, in Chinese Patent Application No. 201180073263.X.
State Intellectual Property Office, Peoples Republic of China, Second Office Action dated Jun. 2, 2016 in Chinese Patent Application No. 201180073263.X.

(56) References Cited

OTHER PUBLICATIONS

Taiwan Intellectual Property Office, Office Action in Re-Examination dated Jun. 14, 2016 in Taiwan Patent Application No. 101132336. (Translation Redacted).
Great Britain Intellectual Property Office, Examination Report dated Jun. 29, 2016 in Great Britain Patent Application No. GB1402807.0.
Great Britain Intellectual Property Office, Examination Report dated Jul. 20, 2016 in Great Britain Patent Application No. GB1609345.2.
Great Britain Intellectual Property Office, Examination Report dated Jul. 20, 2016 in Great Britain Patent Application No. GB1609270.2.
Korea Intellectual Property Office, Notice of Preliminary Rejection dated Nov. 30, 2016 in Korean Application No. 10-2016-7018264.
United States Patent and Trademark Office, Office Action dated Dec. 16, 2016 in U.S. Appl. No. 15/134,756.
United States Patent and Trademark Office, Office Action dated Dec. 16, 2016 in U.S. Appl. No. 15/134,770.
Great Britain Intellectual Property Office, Examination Report dated Jan. 12, 2017 in Great Britain Patent Application No. GB1402807.0.
Great Britain Intellectual Property Office, Examination Report dated Jan. 19, 2017 in Great Britain Patent Application No. GB1609270.2.
Great Britain Intellectual Property Office, Examination Report dated Jan. 19, 2017 in Great Britain Patent Application No. GB1609345.2.
Japan Intellectual Property Office, Non Final Rejection dated Mar. 7, 2017 in Japanese Patent Application No. 2014-528345.
Korean Intellectual Property Office, Office Action dated Mar. 31, 2017 in Korean Patent Application No. 10-2016-7012946.
Korean Intellectual Property Office, Office Action dated Mar. 31, 2017 in Korean Patent Application No. 10-2016-7012948.
United States Patent and Trademark Office, Final Office Action dated May 18, 2017 and Request for Continued Examination filed Aug. 16, 2017, in U.S. Appl. No. 15/134,756.
United States Patent and Trademark Office, Final Office Action dated May 18, 2017 and Reply filed Aug. 16, 2017, in U.S. Appl. No. 15/134,770.
Korea Intellectual Property Office, Office Action dated Jun. 29, 2017 in Korean Patent Application No. 10-2016-7018264.
State Intellectual Property Office of the People's Republic of China, Notice of Reexamination dated Jun. 5, 2017, in Chinese Patent Application 201180073263.X.
Japan Patent Office, Notification of Reasons of Refusal dated Jul. 25, 2017, in Japanese Patent Application No. 2016-153401.
Japan Patent Office, Notification of Reasons of Refusal dated Jul. 25, 2017, in Japanese Patent Application No. 2016-153400.
Japan Patent Office, Notification of Reasons of Refusal dated Jul. 25, 2017, in Japanese Patent Application No. 2016-153399.
Taiwan Intellectual Property Office, Office Action dated Oct. 17, 2017, in Taiwanese Patent Application No. 104137165. (Translation Redacted).
Taiwan Intellectual Property Office, Office Action dated Oct. 17, 2017, in Taiwanese Patent Application No. 105114441. (Translation Redacted).
Taiwan Intellectual Property Office, Office Action dated Oct. 17, 2017, in Taiwanese Patent Application No. 105118773. (Translation Redacted).
Korea Intellectual Property Office, Notice of Preliminary Rejection dated Oct. 31, 2017 in Korean Patent Application No. 10-2016-7012948.
Korea Intellectual Property Office, Notice of Preliminary Rejection dated Oct. 31, 2017 in Korean Patent Application No. 10-2016-7012946.
United States Patent and Trademark Office, Non-Final Office dated Sep. 22, 2017, in U.S. Appl. No. 15/134,756.

POWER EFFICIENT PROCESSOR ARCHITECTURE

This application is a continuation of U.S. patent application Ser. No. 15/134,770, filed Apr. 21, 2016, which is a continuation of U.S. patent application Ser. No. 13/992,361, filed Jun. 7, 2013, now U.S. Pat. No. 9,360,927, issued Jun. 7, 2016, which was the National Stage of International Application No. PCT/US2011/050580, filed Sep. 6, 2011, the content of which is hereby incorporated by reference.

BACKGROUND

Typically, a processor uses a power saving sleep mode such as in accordance with an Advanced Configuration and Power Interface (ACPI) standard (e.g., Rev. 3.0b, published Oct. 10, 2006) when possible. These so-called C-state core low power states (ACPI C-states) in addition to voltage and frequency scaling (DVFS or ACPI performance state (P-states)) can save power when a core is idle or not fully utilized. However, even in a multi-core processor context, a core is often woken from an efficient sleep state to perform a relatively simple operation, and is then returned to the sleep state. This operation can adversely affect power efficiency, as there is a cost in both latency and power consumption for exiting and returning to low power states. During the state transition power may be consumed in some types of processors without useful work being accomplished, to the detriment of power efficiency.

Examples of operations to be handled upon exiting a low power state include keyboard inputs, timer interrupts, network interrupts and so on. To handle these operations in a power sensitive manner, current operating systems (OSs) change program behavior by processing larger amounts of data at a time, or moving to a tickless OS where there are no periodic timer interrupts, and only sporadic programmed ones. Another strategy is to use timer coalescing, where multiple interrupts are grouped and handled at the same time. But in addition to changing a program's behavior, all of these options raise complexity and still can lead to power inefficient operation. Further, some types of software (e.g., media playback) may make attempts to defeat hardware power efficiency mechanisms by requesting frequent, periodic wakes regardless of how much work needs to be accomplished. Thus, the tickless/timer coalescing strategies can save some power by reducing unnecessary wakes from deep C-states, but they require invasive changes to the OS and may take a significant amount of time to propagate through a computing ecosystem, as such changes are not implemented until a new version of an operating system is distributed.

DETAILED DESCRIPTION

In various embodiments, average power consumption can be reduced in a heterogeneous processor environment. This heterogeneous environment may include large fast cores and smaller more power-efficient cores that are combined for system and power efficiency reasons. Further still, embodiments may provide this power control in a manner that is transparent to an operating system (OS) executing on the processor. However, the scope of the present invention is not limited to heterogeneous environments, and can also be used in homogeneous environments (from an OS-transparent but not necessarily hardware-heterogeneous perspective) to reduce average power (e.g., to keep as many cores asleep in a multiprocessor environment as possible). Embodiments may be especially suitable in hardware-accelerated environments such as tablet computer-based and system-on-chip (SoC) architectures where the cores are often asleep.

In general, embodiments may provide for power control by steering all wakeup signals to a smaller core rather than a larger core. In this way, it is possible to reduce average power by well over two times when the system is 95% idle. As will be described, in many embodiments this smaller core can be sequestered from the OS. That is, the presence of this smaller core is unknown to the OS, and this core is thus invisible to the OS. As such, embodiments can provide for power efficient processor operation via processor hardware in a manner that is transparent to the OS and applications executing on the processor.

Figure 1:
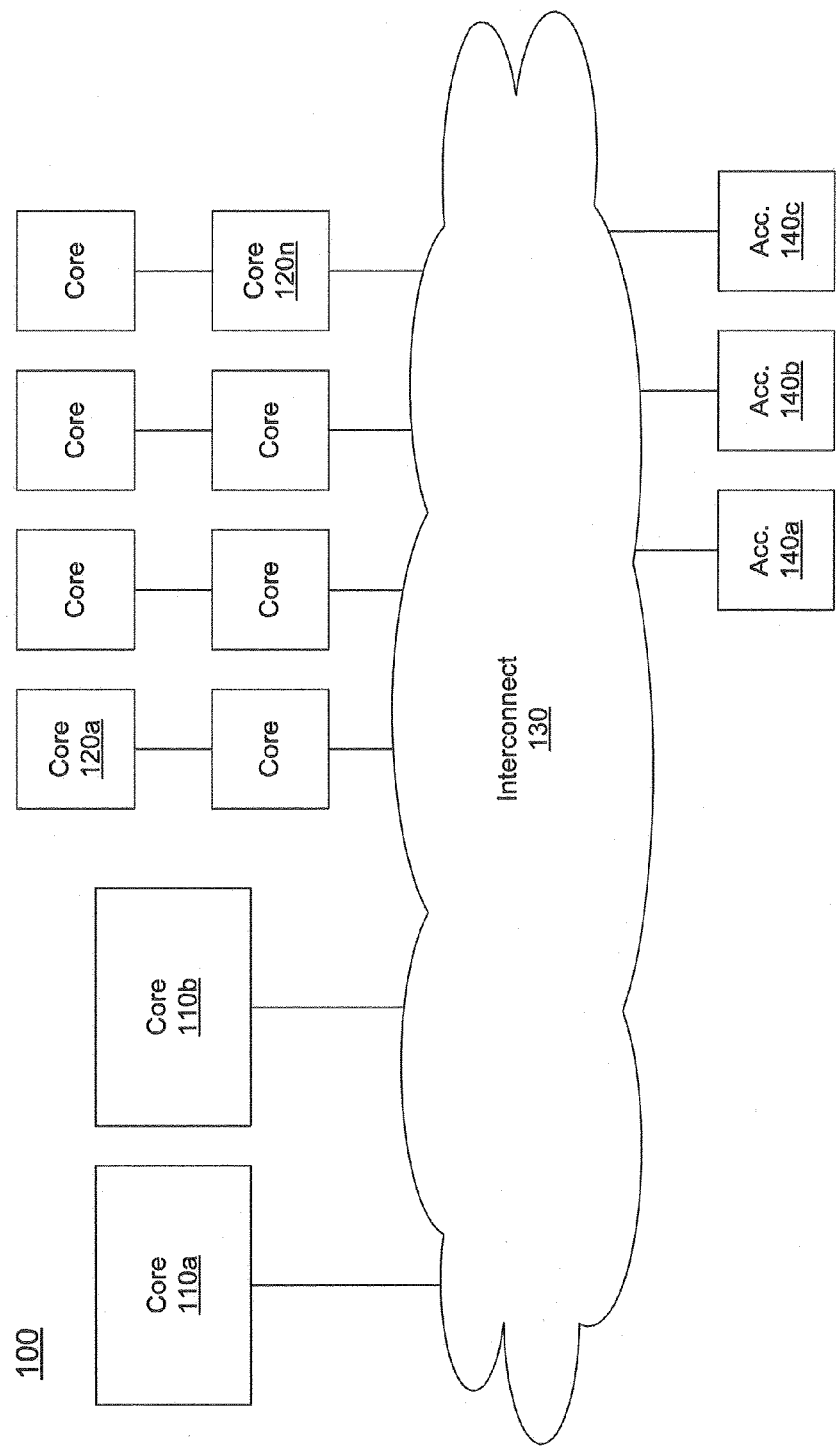
FIG. 1 is a block diagram of a processor in accordance with one embodiment of the present invention.

Referring now to FIG. 1, shown is a block diagram of a processor in accordance with one embodiment of the present invention. As seen in FIG. 1, processor 100 may be a heterogeneous processor having a number of large cores, small cores and accelerators. Although described herein in the context of a multi-core processor, understand embodiments are not so limited and in implementations may be within a SoC or other semiconductor-based processing devices. Note that the accelerators can perform work whether the processor cores are powered up or not, based on a queue of input work. In the embodiment of FIG. 1, processor 100 includes a plurality of large cores. In the specific embodiment shown, two such cores 110a and 110b (generally, large cores 110) are shown, although understand that more than two such large cores may be provided. In various implementations, these large cores may be out-of-order processors having a relatively complex pipelined architecture and operating in accordance with a complex instruction set computing (CISC) architecture.

In addition, processor 100 further includes a plurality of small cores 120a-120n (generally, small cores 120). Although 8 such cores are shown in the embodiment of FIG. 1, understand the scope of the present invention is not limited in this aspect. In various embodiments, small cores 120 may be power efficient in-order processors, e.g., to execute instructions according to a CISC or a reduced instruction set computing (RISC) architecture. In some implementations, two or more of these cores may be coupled together in series to perform related processing, e.g., if several large cores are in power-saving states then one or more smaller cores may be active to perform work that would otherwise wake the large cores. In many embodiments, small cores 120 can be transparent to an OS, although in other embodiments the small and large cores may be exposed to the OS, with configuration options available. In general, any core mix between large and small cores can be used in different embodiments. For example, a single small core can be provided per large core, or in other embodiments a single small core may be associated with multiple large cores.

As used herein, the term "large core" may be a processor core that is of a relatively complex design and which may consume a relatively large amount of chip real estate as compared to a "small core," which may be of a lesser complexity design and consume a correspondingly smaller amount of chip real estate. In addition, the smaller cores are more power efficient than the larger cores, as they may have a smaller thermal design power (TDP) than the larger cores. However, understand that the smaller cores may be limited in their processing capabilities as compared to the large cores. For example, these smaller cores may not handle all operations that are possible in the large cores. And in addition, it is possible that the smaller cores can be less efficient in instruction processing. That is, instructions may be performed more rapidly in the large cores than the small cores.

As further seen, both large cores 110 and small cores 120 may be coupled to an interconnect 130. Different implementations of this interconnect structure can be realized in different embodiments. For example, in some embodiments the interconnect structure can be according to a front side bus (FSB) architecture or an Intel® Quick Path Interconnect (QPI) protocol. In other embodiments, the interconnect structure can be according to a given system fabric.

Still referring to FIG. 1, multiple accelerators 140a-140c also may be coupled to interconnect 130. Although the scope of the present invention is not limited in this regard, the accelerators may include media processors such as audio and/or video processors, cryptographic processors, fixed function units and so forth. These accelerators may be designed by the same designers that designed the cores, or can be independent third party intellectual property (IP) blocks incorporated into the processor. In general, dedicated processing tasks can be performed in these accelerators more efficiently than they can be performed on either the large cores or the small cores, whether in terms of performance or power consumption. Although shown with this particular implementation in the embodiment of FIG. 1, understand the scope of the present invention is not limited in this regard. For example, instead of having only two types of cores, namely a large core and a small core, other embodiments may have multiple hierarchies of cores, including at least a large core, a medium core and a small core, with the medium core having a larger chip real estate than the small core but a smaller chip real estate than the large core and corresponding power consumption between that of the large core and the small core. In still other embodiments, the small core can be embedded within a larger core, e.g., as a subset of the logic and structures of the larger core.

Figure 2:
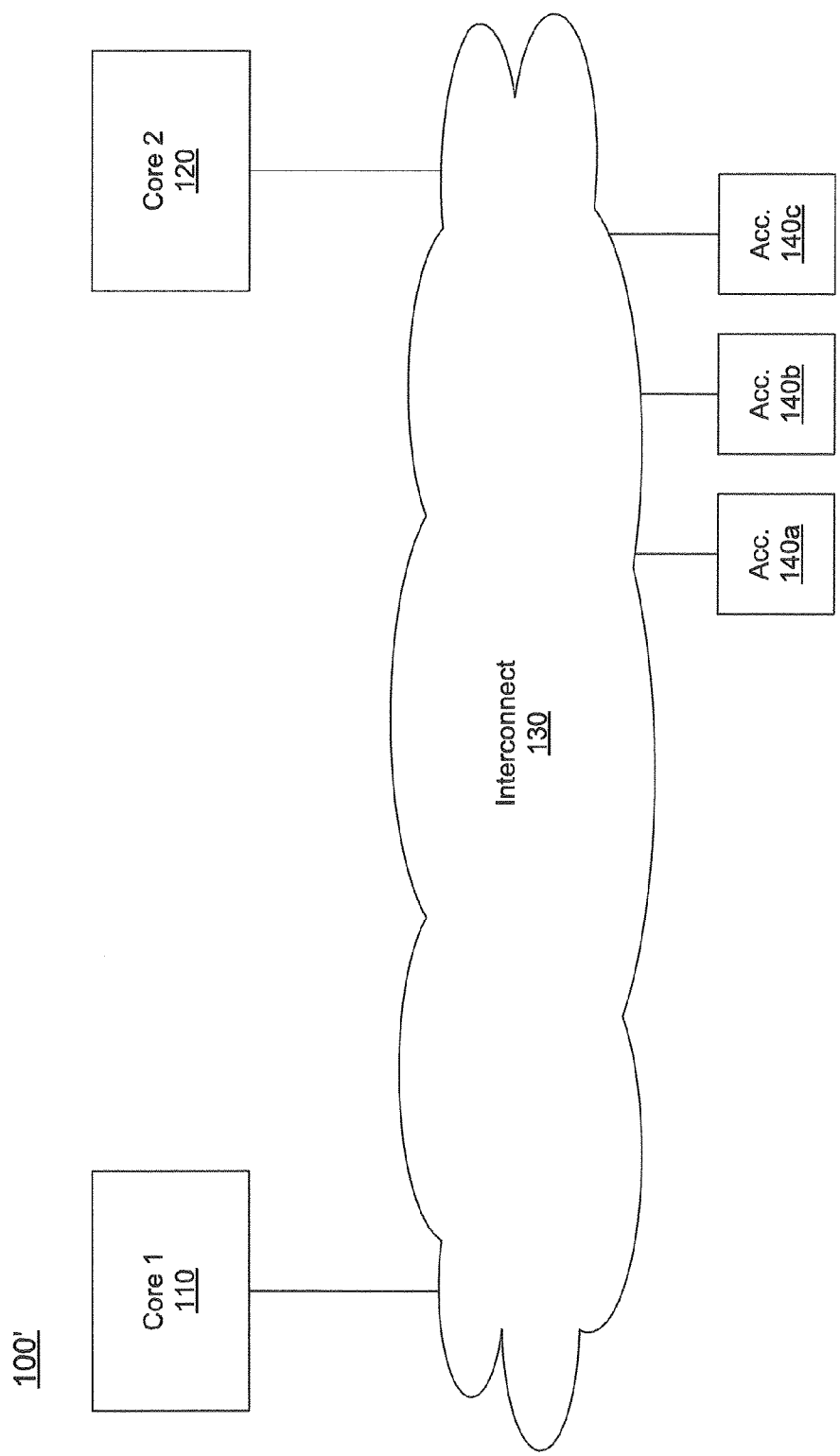
FIG. 2 is a block diagram of a processor in accordance with another embodiment of the present invention.

Furthermore, while shown in the embodiment of FIG. 1 as including multiple large cores and multiple small cores, it is possible that for certain implementations such as a mobile processor or SoC, only a single large core and a single small core may be provided. Specifically referring now to FIG. 2, shown is a block diagram of a processor in accordance with another embodiment of the present invention in which processor 100' includes a single large core 110 and a single small core 120, along with interconnect 130 and accelerators 140a-c. As mentioned, this implementation may be suitable for mobile applications.

As example power figures for a typical large core, power consumption may be on the order of approximately 6000 milliwatts (mW), while for a medium core power consumption may be on the order of approximately 500 mW, and for a very small core power consumption may be on the order of approximately 15 mW. In an implementation that avoids waking the large core, significant power benefits may be achieved.

Embodiments allow the larger, less power-efficient cores to remain in low power sleep states longer than they otherwise would be able to. By steering interrupts and other core waking events to the smaller cores instead of the larger cores, the smaller cores may run longer and wake more often, but this is still more power efficient than waking a large core to perform a trivial task such as data moving. Note that as described below for some operations, the large core may be powered on for execution, as for instance smaller cores might not support vector operations (e.g., AVX operations), complex addressing modes or floating point (FP) operations. In such cases a wake signal could be re-routed from the small core to the large core.

For example, while performing hardware-accelerated 1080p video playback on a processor, over 1000 transitions into and out of core C6 state and nearly 1200 interrupts occur each second. If even a portion of these wake events are re-steered to a smaller core using an embodiment of the present invention, significant power savings can be achieved.

Figure 3:
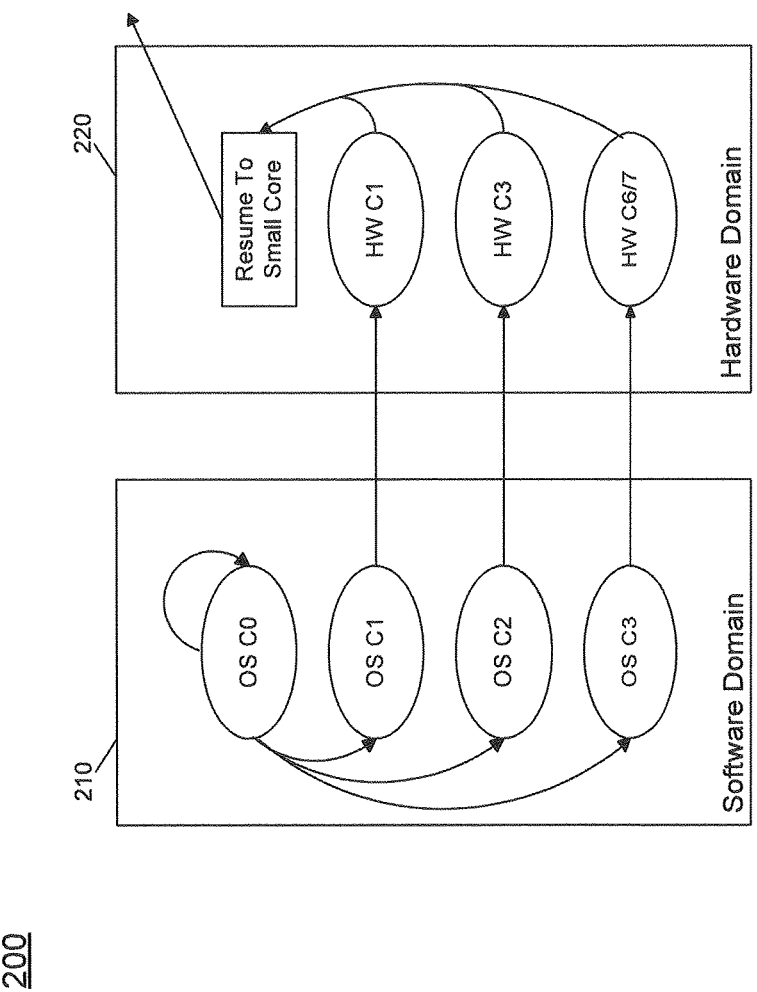
FIG. 3 is a flow diagram of resume flow options between cores in accordance with one embodiment of the present invention.

FIG. 3 summarizes resume flow options between cores in accordance with one embodiment of the present invention. As seen in FIG. 3, a software domain 210 and a hardware domain 220 are present. In general, software domain 210 corresponds to OS operations with regard to power management, e.g., according to an ACPI implementation. In general, the OS, based on its knowledge of upcoming tasks according to its scheduling mechanism, can select one of multiple C-states to request the processor to enter into a low power mode. For example, an OS can issue an MWAIT call which includes a particular low-power state that is being requested.

In general, C0 corresponds to a normal operating state in which instructions are executed, while states C1-C3 are OS lower power states, each having a different level of power savings and a corresponding different level of latency to return to the C0 state. As seen, depending on an expected workload of the processor, the OS may select a non-idle state, e.g., OS C0 or one of multiple idle states, e.g., OS C-states C1-C3. Each of these idle states can be mapped to a corresponding hardware low power state that is under control of processor hardware. Thus processor hardware can map a given OS C-state to a corresponding hardware C-state, which may provide for greater power savings than that dictated by the OS. In general, lighter C-states (e.g., C1) save less power but have lower resume times than deeper C-states (e.g. C3). In various embodiments, hardware domain 220 and the mapping of OS C-states to processor C-states can be performed by a power control unit (PCU) of the processor, although the scope of the present invention is not limited in this regard. This mapping may be based on a prior history of OS-based power management requests. Also, the decision can be based on a status of the overall system, configuration information and so forth.

In addition, the PCU or other processor logic may be configured to direct all wake events to a smallest available core (which may be an OS invisible core, in various embodiments). As seen in FIG. 3, upon exit from a given hardware-based idle state, control resumes directly to the smallest available core such that the state is transferred to this smallest core. In contrast, in a conventional hardware/software resumption, control returns only to the large core. Generally an OS selects a C-state based on the expected idle time and resume latency requirements, which the architecture maps to a hardware C-state. Thus as seen in the embodiment of FIG. 3 all resume signals (such as interrupts) are routed to the smallest available core, which determines whether it can handle the resume operation, or instead is to send a wake signal to a larger core to continue. Note that embodiments do not interfere with existing P-states or C-state auto-demotion where the hardware selects a hardware C-state with lower resume latency automatically based on measured experimental efficiency. Note that it is also possible that the PCU or another programmable entity may examine incoming wake events to determine which core (large or small) to route them to.

As described above, in some implementations, the small core itself can be hidden from the OS and application software. For example, a small-large core pair can be abstracted and hidden from application software. In a low power state all cores can be asleep while an accelerator (such as a video decode accelerator) performs a given task such as a decoding task. When the accelerator runs out of data, it directs a wake signal to request additional data that can be from the small core, which wakes and determines that this simple data move operation can be accomplished without waking the large core, thus saving power. If a timer interrupt arrives and the small core wakes up and instead detects that a complex vector operation (like a 256-bit AVX instruction) exists in the instruction stream, the large core may be awakened to handle the complex instruction (and other instructions in this stream) to enable reduced latency. In an alternate implementation a global hardware observation mechanism which can be located in the PCU or another uncore location near the PCU, or as a separate section of hardware logic on the global interconnect, or as an addition to the internal control logic of the small core, can detect that the small core encounters the AVX instruction and may generate an undefined instruction fault, which may cause a shut down of the small core and re-steer the instruction stream to the larger core after waking it. Note that this behavior may extend beyond instructions to configuration or features. If the small core encounters a write to a configuration space that only exists on the large core, for instance, it may request a wake of the large core.

Figure 4:
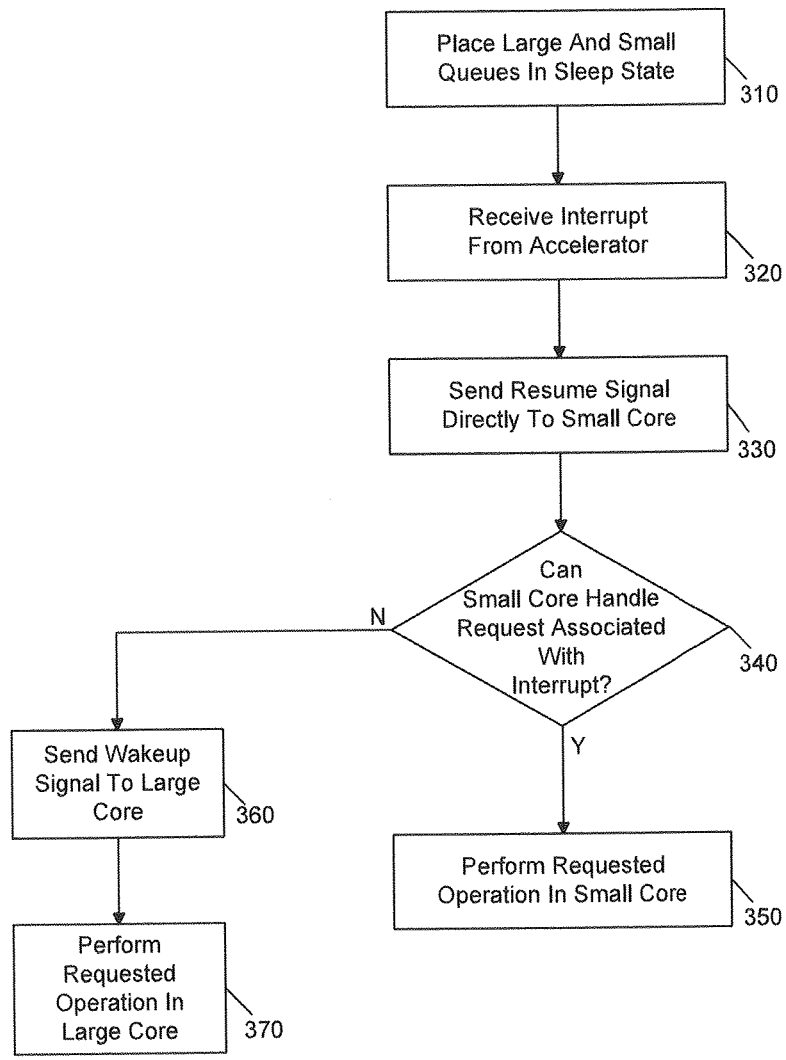
FIG. 4 is a flow diagram of a method in accordance with an embodiment of the present invention.

Referring now to FIG. 4, shown is a flow diagram of a method in accordance with an embodiment of the present invention. Note that the method of FIG. 4 may be performed by various agents, depending upon a given implementation. For example, in some embodiments method 300 may be implemented in part by system agent circuitry within a processor such as a power control unit, which can be in a system agent or uncore portion of a processor. In other embodiments, method 300 may be implemented in part by interconnect logic such as power control logic within an interconnect structure that can receive interrupts, e.g., from accelerators coupled to the interconnect structure and forward the interrupts to a selected location.

As seen in FIG. 4, method 300 may begin by placing both large and small cores in a sleep state (block 310). That is, it is assumed that no active operations are being performed in the cores. As such, they can be placed in a selected low power state to reduce power consumption. Although the cores may not be active, other agents within a processor or SoC such as one or more accelerators may be performing tasks. At block 320, an interrupt may be received from such an accelerator. This interrupt may be sent when the accelerator has completed a task, encountered an error, or when the accelerator needs additional data or other processing is to be performed by another component such as a given core. Control passes next to block 330 where the logic can send a resume signal directly to the small core. That is, the logic may be programmed to always send a resume signal to the small core (or a selected one of multiple such small cores, depending upon system implementation) when both large and small cores are in a low power state. By sending interrupts directly and always to the small core, greater power consumption by the large core can be avoided for the many instances of interrupts for which the small core can handle the requested operation. Note that certain types of filtering or caching mechanisms may be added to block 330 such that certain interrupt sources are always routed to one core or another, as desired to balance performance and power.

Referring still to FIG. 4, control next passes to diamond 340 where it can be determined whether the small core can handle a request associated with the interrupt. Although the scope of the present invention is not limited in this regard, in some embodiments this determination may be done in the small core itself, after it is awoken. Or the logic that performs the method of FIG. 4 can perform the determination (and in which case it is possible for this analysis to be done prior to sending the resume signal to the small core).

As an example, the small core may determine whether it can handle the requested operation based on performance requirements and/or instruction set architecture (ISA) capabilities of the small core. If the small core cannot handle a requested operation because it does not have ISA support, front end logic of the small core can parse a received instruction stream and determine that at least one instruction in the stream is not supported by the small core. Accordingly, the small core may issue an undefined instruction fault. This undefined fault may be sent to the PCU (or another entity), which can analyze the fault and the state of the small core to determine whether the undefined fault is as a result of the small core not having hardware support for handling instruction, or if instead it is a true undefined fault. In the latter case, the undefined fault may be forwarded to an OS for further handling. If the fault is due to the small core not having the appropriate hardware support for handling the instruction, the PCU can cause the execution state transferred to this small core to be transferred to a corresponding large core to handle the requested instruction(s).

In other embodiments, a transfer of the execution state between small core and large core may occur when it is determined that the small core has been executing for too long a time or with too low a performance level. That is, assume that the small core has been executing for many thousands or millions of processor cycles to perform requested tasks. Because of the more expedient execution available in the large core, it is possible that greater power reductions can occur by transferring the state to the large core to enable the large core to more rapidly conclude the task.

Still referring to FIG. 4 if it is determined that the requested operation can be handled in the small core, control passes to block 350 where the operation is thus performed in the small core. For example, assume that the requested operation is a data move operation, the small core can perform the requested processing and if no other tasks are pending for the small core, it again can be placed into a low power state.

If instead it is determined at diamond 340 that the small core cannot handle the requested operation, e.g., if the operation is a relatively complex operation that the small core is not configured to handle, control instead passes to block 360. There, a wakeup signal can be sent, e.g., directly from the small core to the large core, to cause the large core to be powered up. Accordingly, control passes to block 370 where the requested operation can thus be performed in the large core. Note that although described with this particular set of operations in the embodiment of FIG. 4, understand the scope of the present invention is not limited in this regard.

Thus in various embodiments, a mechanism may be provided to allow hardware interrupts and other wake signals to be routed directly to the small core, without waking the large core. Note that in different implementations, the small core itself or a supervisory agent can determine whether the wake signal and processing can be completed without waking the large core. In representative cases, the smaller core may be much more power efficient than the larger cores, and may as a result support only a subset of the instructions that the large core supports. And, many operations to be performed upon waking from a low power state can be offloaded to a simpler, more power-efficient core to avoid waking a larger more powerful core in heterogeneous environments (where many cores of various sizes are included in a system for performance or power efficiency reasons).

Figure 5:
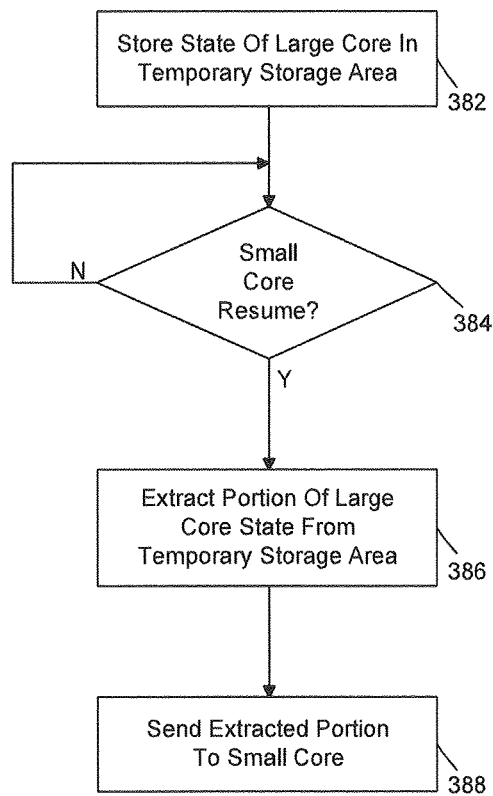
FIG. 5 is a flow diagram of a method for transferring execution state in accordance with an embodiment of the present invention.

Referring now to FIG. 5, shown is a flow diagram of a method for transferring execution state in accordance with an embodiment of the present invention. As shown in FIG. 5, method 380 may be performed by logic of a PCU, in one embodiment. This logic may be triggered responsive to a request to place a large core into a low power state. Responsive to such request, method 380 may begin at block 382 where the execution state of the large core can be stored in a temporary storage area. Note that this temporary storage area may be a dedicated state save area associated with the core or it can be within a shared cache such as a last level cache (LLC). Although the scope of the present invention is not limited in this regard, the execution state can include general-purpose registers, status and configuration registers, execution flags and so forth. In addition, at this time additional operations to enable the large core to be placed into a low power state can be performed. Such operations include flushing of the internal caches and other state as well as signaling for shutdown of the given core.

Still referring to FIG. 5, it can then be determined whether the small core has resumed (diamond 384). This resumption may occur as a result of a resume signal received responsive to an interrupt coming from, e.g., an accelerator of the processor. As part of the small core resumption, control passes to block 386 where at least a portion of the large core state can be extracted from the temporary storage area. More specifically, this extracted portion may be that portion of the large core's execution state that is to be used by the small core. As examples, this state portion may include the main register contents, various flags such as certain execution flags, machine status registers and so forth. However, certain state may not be extracted, such as state associated with one or more execution units present in the large core that do not have corresponding execution units in the small core. This extracted portion of the state can then be sent to the small core (block 388), thus enabling the small core to perform whatever operations are appropriate responsive to the given interrupt. Although shown with this particular implementation in the embodiment of FIG. 5, understand the scope of the present invention is not limited in this regard.

Figure 6:
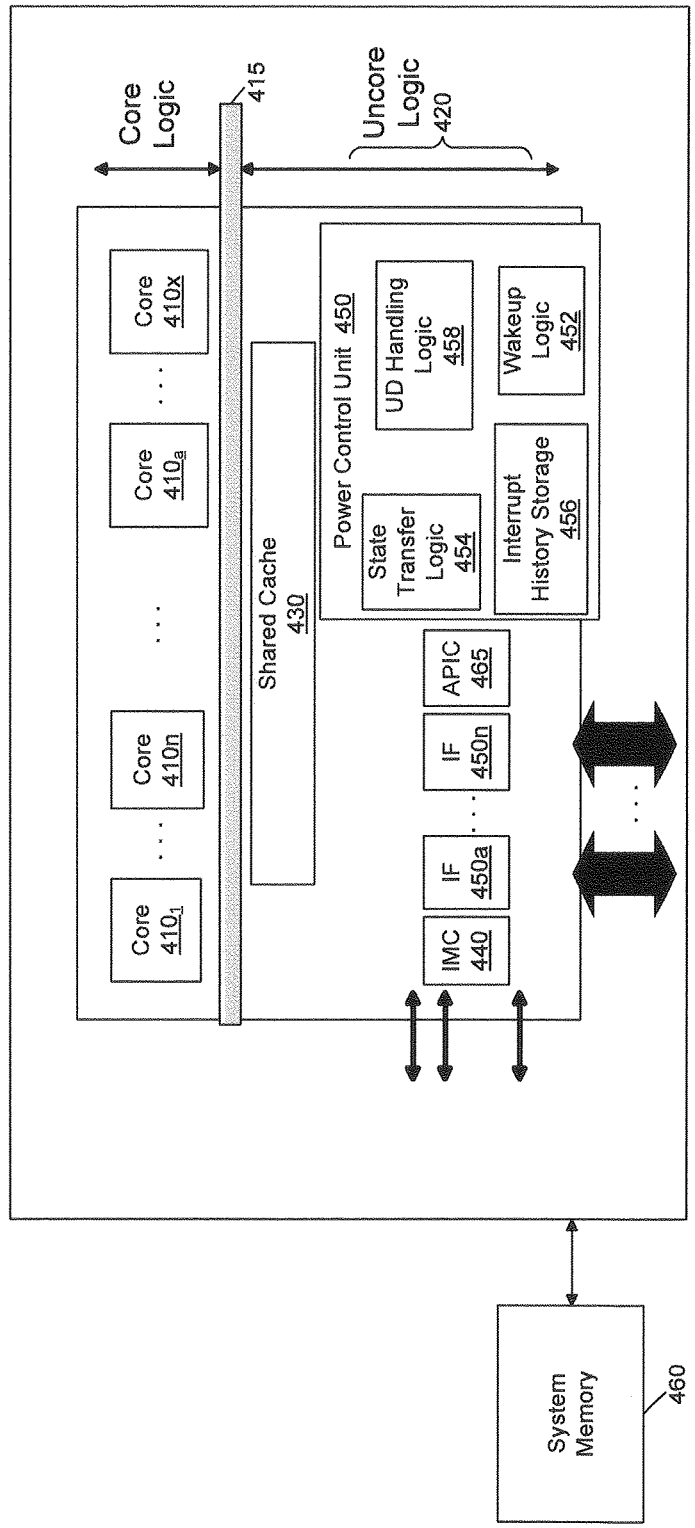
FIG. 6 is a block diagram of a processor in accordance with yet another embodiment of the present invention.

Referring now to FIG. 6, shown is a block diagram of a processor in accordance with an embodiment of the present invention. As shown in FIG. 6, processor 400 may be a multicore processor including a first plurality of cores $410_1$-$410n$ that can be exposed to an OS, and a second plurality of cores 410a-x that are transparent to the OS.

As seen, the various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450a-n, power control unit 455, and an advanced programmable interrupt controller (APIC) 465.

PCU 450 may include various logic to enable power efficient operation in accordance with an embodiment of the present invention. As seen, PCU 450 can include wakeup logic 452 that can perform wakeups as described above. Thus logic 452 can be configured to always wake a small core first. However, this logic can be configured dynamically to not perform such small core direct wakeups in certain circumstances. For example, a system can be dynamically configured for power saving operations, e.g., when the system is a mobile system running on a battery. In such circumstances, the logic can be configured to always wake the small core. Instead, if the system is a server system, desktop or laptop system that is connected to wall power, embodiments may provide for a user-based selection to select latency and performance over power savings. Thus wakeup logic 452 can be configured in such instances to wake up a large core rather than a small core responsive to an interrupt. Similar wakeups of the large core can be performed when it has been determined that a large number of small core wakeups result in a redirection to a large core.

To further enable power efficient operation, PCU 450 may further include a state transfer logic 454 that can perform transfers of execution state between large and small cores. As discussed above, this logic may be used to take a large core's execution state stored into a temporary storage during a low power state, and extract at least a portion of that state to provide to a small core upon a small core wakeup.

Further still, PCU 450 may include an interrupt history storage 456. Such storage may include a plurality of entries each identifying an interrupt that has occurred during system operation and whether the interrupt was successfully handled by the small core. Then based on this history, when a given interrupt is received, a corresponding entry of this storage can be accessed to determine whether a previous interrupt of the same type was successfully handled by the small core. If so, the PCU can direct the new incoming interrupt to the same small core. Instead if it is determined based on this history that this type of interrupt was not successfully handled by small core (or with unsatisfactorily low performance), the interrupt can instead be sent to a large core.

Still referring to FIG. 6, PCU 450 may further include an undefined handling logic 458. Such logic may receive undefined faults issued by a small core. Based on this logic, information in the small core can be accessed. Then it can be determined whether the undefined fault is as a result of a lack of support for the instruction in the small core or for another reason. Responsive to this determination, the logic can either cause the small core's state to be merged with the remaining part of the large core execution state (stored in a temporary storage area) and thereafter sent to the large core for handling of the interrupt, or send the undefined fault to an OS for further handling. When it is determined that a small core cannot handle the interrupt, the portion of the execution state provided to the small core is thus taken from the small core and saved back to the temporary storage location and accordingly, the small core can be powered down. This merged state along with the remaining execution state of the large core can then be provided back to the large core to enable the large core to handle an interrupt that the small core could not handle. Note also that an entry in interrupt history storage 456 can be written responsive to such mishandling by the small core. Although shown with this particular logic in the embodiment of FIG. 6, understand the scope of the present invention is not limited in this regard. For example, the various logics of PCU 450 can be implemented in a single logic block in other embodiments.

APIC 465 may receive various interrupts, e.g., issued from accelerators and direct the interrupts as appropriate to a given one or more cores. In some embodiments, to maintain the small cores as hidden to the OS, APIC 465 may dynamically remap incoming interrupts, each of which may include an APIC identifier associated with it, from an APIC ID associated with a large core to an APIC ID associated with a small core.

With further reference to FIG. 6, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 6, the scope of the present invention is not limited in this regard.

Note that various architectures are possible to enable different coupling or integration of the large and small cores. As examples, the degree of coupling between these disparate cores can depend on a variety of engineering optimization parameters related to die area, power, performance and responsiveness.

Figure 7:
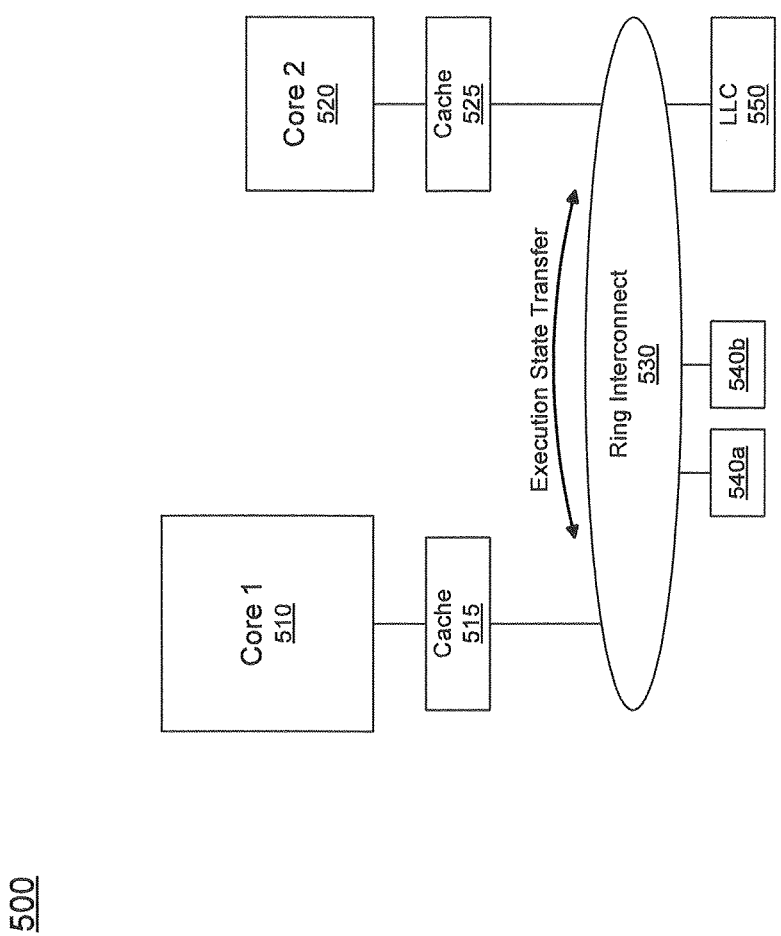
FIG. 7 is a block diagram of a processor in accordance with a still further embodiment of the present invention.

Referring now to FIG. 7, shown is a block diagram of a processor in accordance with another embodiment of the present invention. As shown in FIG. 7, processor 500 may be a true heterogeneous processor including a large core 510 and a small core 520. As seen, each processor may be associated with its own private cache memory hierarchy, namely cache memories 515 and 525 which may include both level 1 and level 2 cache memories. In turn, the cores may be coupled together via a ring interconnect 530. Multiple accelerators 540a and 540b and a LLC, namely an L3 cache 550 which may be a shared cache are also coupled to the ring interconnect. In this implementation, execution state between the two cores may be transferred via ring interconnect 530. As described above, the execution state of the large core 500 can be stored in cache 550 prior to entry into a given low power state. Then upon wakeup of small core 520, at least a subset of this execution state can be provided to the small core to ready the core for execution of an operation that triggered its wakeup. Thus in the embodiment of FIG. 7, the cores are loosely coupled via this ring interconnect.

Although shown for ease of illustration with a single large core and a single small core, understand the scope of the present invention is not limited in this regard. Using an implementation such as that of FIG. 7, any state or communication to be exchanged can be handled either via the ring architecture (which may also be a bus or fabric architecture). Or, in other embodiments this communication may be via a dedicated bus between the two cores (not shown in FIG. 7).

Figure 8:
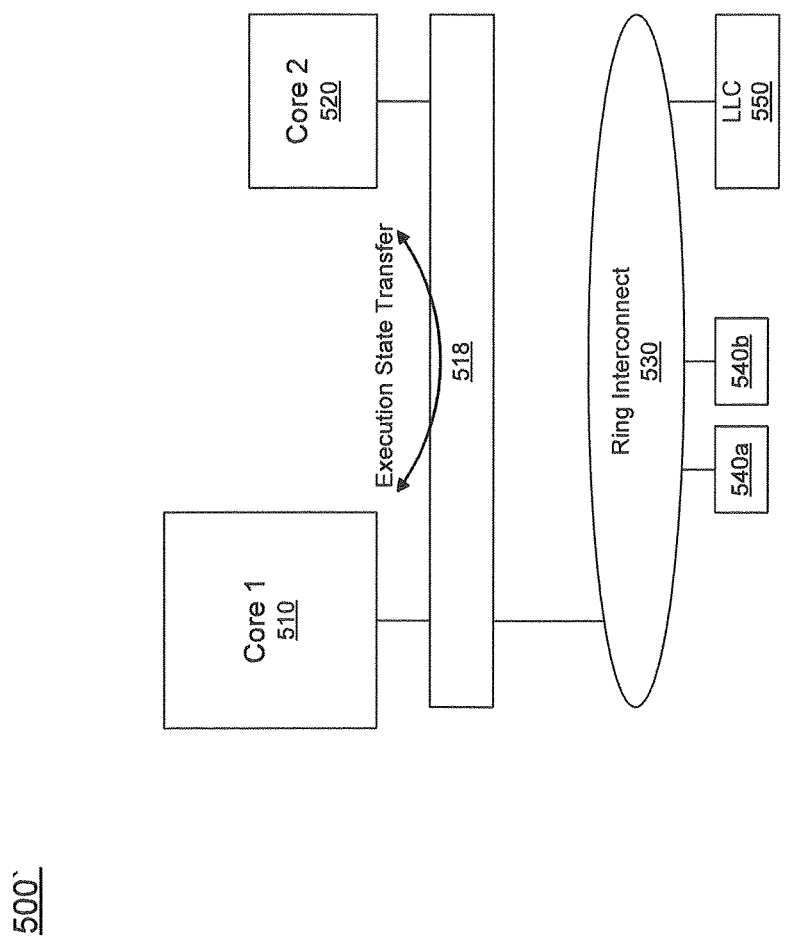
FIG. 8 is a block diagram of a processor in accordance with yet another embodiment of the present invention.

Referring now to FIG. 8, shown is a block diagram of a processor in accordance with yet another embodiment of the present invention. As shown in FIG. 8, processor 500' may be a hybrid heterogeneous processor in which there is tight coupling or integration between the large and small cores. Specifically as seen in FIG. 8 large core 510 and small core 520 may share a shared cache memory 518, which in various embodiments may include both level 1 and level 2 caches. As such, execution state can be transferred from one of the cores to the other via this cache memory, thus avoiding the latency of communication via ring interconnect 530. Note that this arrangement allows for lower power due to reduced data movement overheads and faster communication between the cores, but may not be as flexible.

It should be noted that FIGS. 7 and 8 only illustrate two possible implementations (and only show limited numbers of cores). More implementation varieties are possible, including different arrangements of cores, a combination of the two schemes, more than two types of cores, etc. It is also possible that in a variant of FIG. 8 the two cores may share some components like execution units, an instruction pointer or a register file.

As discussed, embodiments can be completely transparent and invisible to the operating system, and thus no software changes and only minimal increases in resume time from C-states can be achieved. In other embodiments, the presence and availability of small cores can be exposed to the OS to thus enable the OS to make decisions whether to provide an interrupt to a small core or a large core. Furthermore, embodiments may provide mechanisms in system software such as a basic input output system (BIOS) to expose the large and small cores to the OS, or to configure whether the small cores are exposed or not. Embodiments may increase apparent resume times from C-states, but this is acceptable as current platforms vary in resume latencies, and currently no useful work is done during the time a core's state is being restored. The ratio of how different small and large cores are may vary from insignificant differences to major microarchitectural structural differences. According to various embodiments, the most primary differentiators between the heterogeneous cores may be the die area and power consumed by the cores.

In some implementations, a control mechanism may be provided such that if it is detected that the large core is woken most of the time upon resume, waking of the small core first may be bypassed, and the large core can be directly woken, at least for a predetermined period of time to preserve performance. Note that in some embodiments a mechanism to universally re-steer all interrupts and other wake signals to either the small or large core can be exposed to software, both system and user-level software, depending on the power and performance requirements of the application and system. As one such example, a user-level instruction may be provided to perform the steering of wakeup operations to a specified core. Such instruction may be a variant of an MWAIT-like instruction.

In some embodiments, an accelerator can send a hint to the PCU or other management agent with an interrupt to indicate that the requested operation is a relatively simple operation such that it can be handled effectively in the small core. This accelerator-provided hint may be used by the PCU to automatically direct incoming interrupts to the small core for handling.

Figure 9:
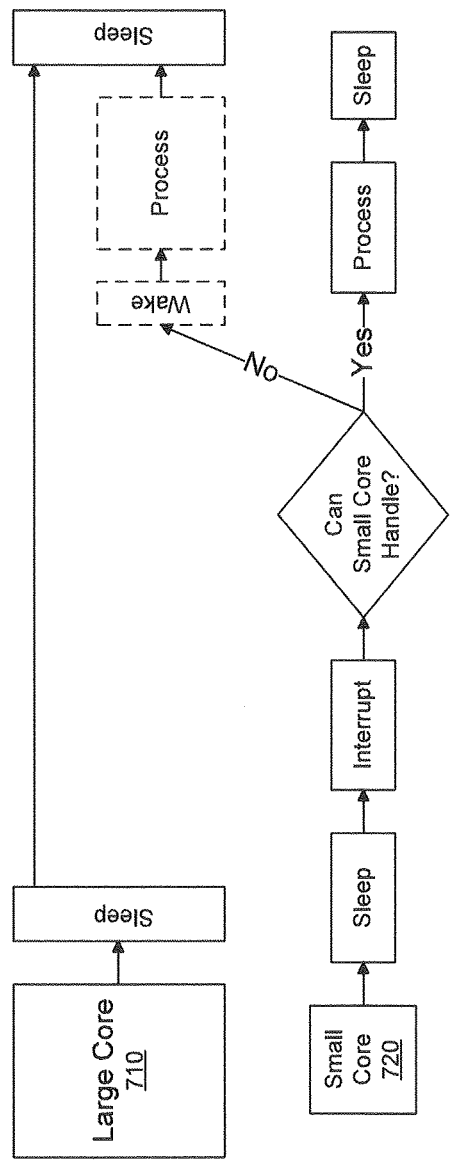
FIG. 9 is a timing diagram in accordance with an embodiment of the present invention.

Referring now to FIG. 9, shown is a timing diagram illustrating operations occurring in a large core 710 and a small core 720 in accordance with an embodiment of the present invention. As seen, a longer sleep duration for large core 710 can be enabled by allowing a device interrupt to be provided to small core 720 directly, and determining in the small core whether it can handle the interrupt. If so, large core 710 can remain in a sleep state and the interrupt handled on small core 720.

Figure 10:
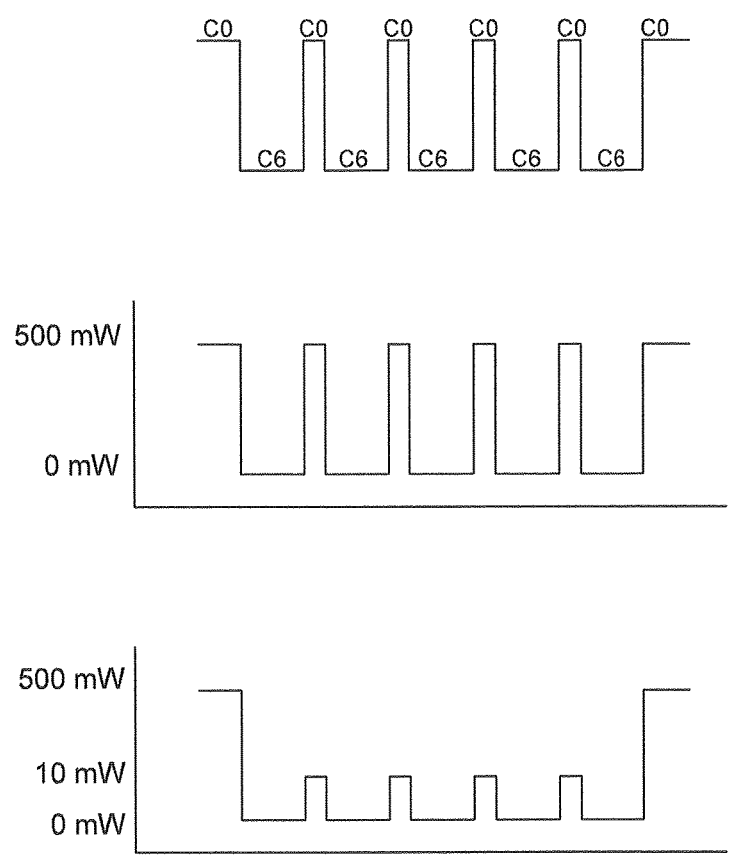
FIG. 10 is a graphical illustration of power savings in accordance with an embodiment of the present invention.

Referring now to FIG. 10, shown is a graphical illustration of power savings in accordance with an embodiment of the present invention. As shown in FIG. 10, in a conventional system that has transitions from an active C0 state to a deep low power state, e.g., a C6 state, core power consumption of a large core can vary from a relatively high level, e.g. 500 mW during every entry into the C0 states to a zero power consumption level in the C6 state (middle view). Instead in an embodiment of the present invention (bottom view), wakeups into a C0 state can be directed away from the large core and to a small core and thus, rather than the 500 mW power consumption level, the small cores can handle C0 states at a much lower power level, e.g., 10 mW in the embodiment of FIG. 10.

Figure 11:
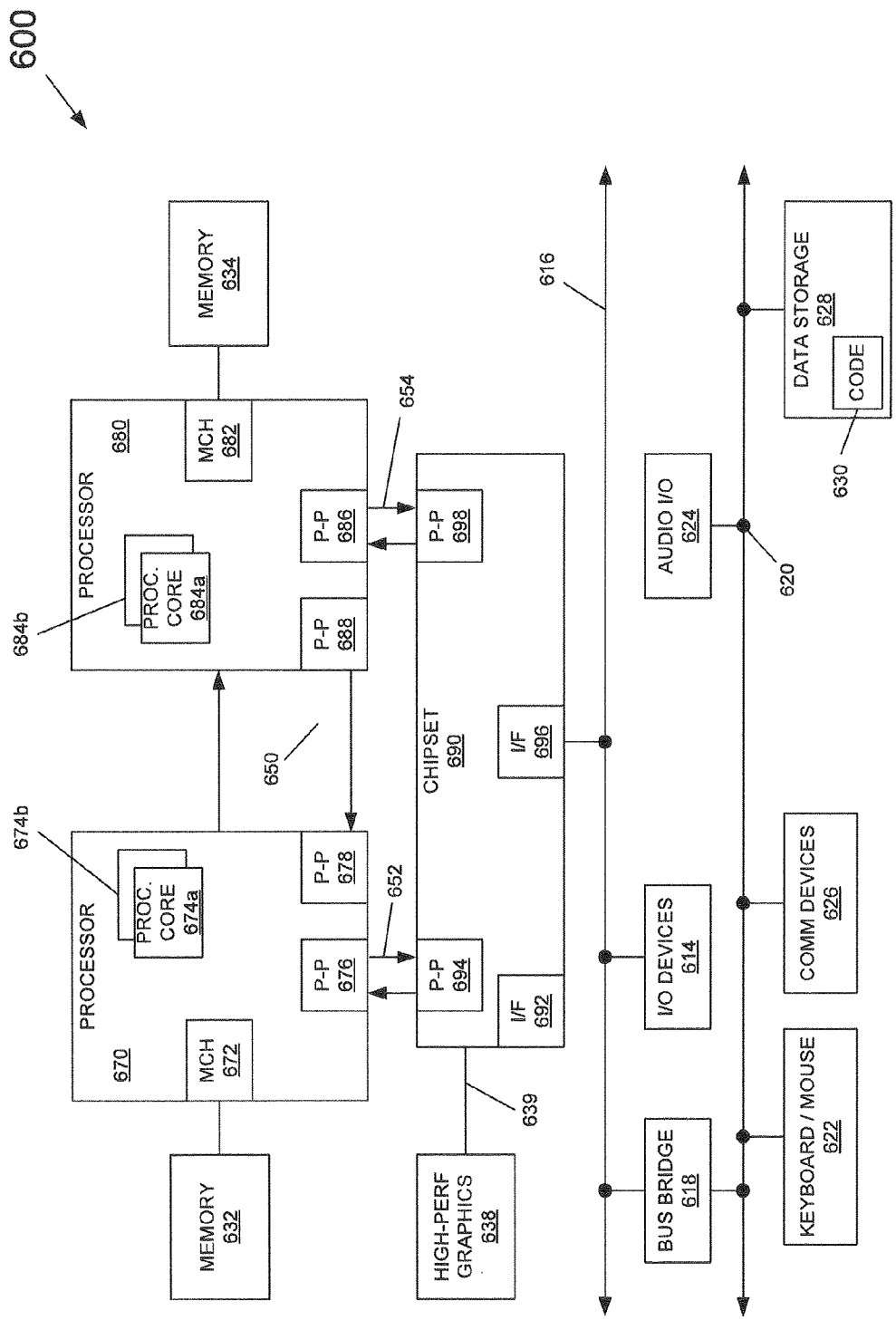
FIG. 11 is a block diagram of a system in accordance with an embodiment of the present invention.

Embodiments may be implemented in many different system types. Referring now to FIG. 11, shown is a block diagram of a system in accordance with an embodiment of the present invention. As shown in FIG. 11, multiprocessor system 600 is a point-to-point interconnect system, and includes a first processor 670 and a second processor 680 coupled via a point-to-point interconnect 650. As shown in FIG. 11, each of processors 670 and 680 may be multicore processors, including first and second processor cores (i.e., processor cores 674a and 674b and processor cores 684a and 684b), although potentially many more cores may be present in the processors. More specifically, each of the processors can include a mix of large, small (and possibly medium) cores, accelerators and so forth, in addition to logic to direct wakeups to the smallest available core, when at least the large cores are in a low power state, as described herein.

Still referring to FIG. 11, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 11, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 11, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 11, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a first plurality of cores;
a second plurality of cores, a core of the second plurality of cores having a lower power consumption when in operation than a core of the first plurality of cores;
an interconnect coupled to the first plurality of cores and coupled to the second plurality of cores;
a shared cache memory coupled to at least the first plurality of cores;
wherein, based at least in part on a performance requirement, an execution state is transferred from the core of the second plurality of cores to the core of the first plurality of cores to enable the core of the first plurality of cores to execute an operation; and
logic to cause the core of the first plurality of cores to execute the operation, wherein the logic is to cause the core of the second plurality of cores and not the core of the first plurality of cores to be woken in response to an interrupt when the core of the first plurality of cores and the core of the second plurality of cores are in a low power state, analyze a plurality of interrupts and if a majority of the plurality of interrupts are to be handled by the core of the first plurality of cores, not wake the core of the second plurality of cores in response to the interrupt and instead wake the core of the first plurality of cores.

2. The processor of claim 1, wherein the logic is to cause the core of the first plurality of cores and not the core of the second plurality of cores to be woken in response to the interrupt when an entry of a table indicates that the core of the second plurality of cores incurred an undefined fault in response to a previous interrupt of the same type as the interrupt.

3. The processor of claim 1, further comprising an interrupt controller to receive a plurality of interrupts and direct the plurality of interrupts to one or more cores of at least one of the first plurality of cores and the second plurality of cores.

4. The processor of claim 1, wherein the execution state comprises a plurality of registers including general-purpose registers and configuration registers.

5. The processor of claim 1, wherein the execution state comprises a subset of an execution state of the core of the second plurality of cores.

6. The processor of claim 5, wherein in response to a determination that the core of the second plurality of cores cannot handle at least one requested operation, the subset of the execution state is to be merged with a remainder of the execution state of the core of the first plurality of cores.

7. A method comprising:
    causing a core of a second plurality of cores of a processor to execute an operation, the processor comprising a first plurality of cores, the second plurality of cores, an interconnect coupled to the first plurality of cores and coupled to the second plurality of cores, and a shared cache memory coupled to at least the first plurality of cores, the core of the second plurality of cores having a lower power consumption when in operation than a core of the first plurality of cores;
    causing, based at least in part on a performance requirement, an execution state to be transferred from the core of the second plurality of cores to the core of the first plurality of cores to enable the core of the first plurality of cores to execute the operation;
    analyzing a plurality of interrupts; and
    if a majority of the plurality of interrupts are to be handled by the first plurality of cores, waking the core of the first plurality of cores to handle an interrupt and not waking the core of the second plurality of cores.

8. The method of claim 7, further comprising causing the core of the second plurality of cores and not the core of the first plurality of cores to be woken in response to the interrupt when the core of the first plurality of cores and the core of the second plurality of cores are in a low power state.

9. The method of claim 8, further comprising causing the core of the first plurality of cores and not the core of the second plurality of cores to be woken in response to the interrupt when an entry of a table indicates that the core of the second plurality of cores incurred an undefined fault in response to a previous interrupt of the same type as the interrupt.

10. At least one non-transitory computer readable storage medium comprising instructions that when executed enable a system to:
    cause a core of a second plurality of cores of a processor to execute an operation, the processor comprising a first plurality of cores, the second plurality of cores, an interconnect coupled to the first plurality of cores and coupled to the second plurality of cores, and a shared cache memory coupled to at least the first plurality of cores, the core of the second plurality of cores having a lower power consumption when in operation than a core of the first plurality of cores;
    cause, based at least in part on a performance requirement, an execution state to be transferred from the core of the second plurality of cores to the core of the first plurality of cores to enable the core of the first plurality of cores to execute the operation;
    analyze a plurality of interrupts; and
    if a majority of the plurality of interrupts are to be handled by the first plurality of cores, wake the core of the first plurality of cores to handle the interrupt and not wake the core of the second plurality of cores.

11. The at least one non-transitory computer readable storage medium of claim 10, further comprising instructions that when executed enable the system to cause the core of the second plurality of cores and not the core of the first plurality of cores to be woken in response to the interrupt when the core of the first plurality of cores and the core of the second plurality of cores are in a low power state.

12. The at least one non-transitory computer readable storage medium of claim 11, further comprising instructions that when executed enable the system to cause the core of the first plurality of cores and not the core of the second plurality of cores to be woken in response to the interrupt when an entry of a table indicates that the core of the second plurality of cores incurred an undefined fault in response to a previous interrupt of the same type as the interrupt.

* * * * *